J. N. SCISM.
PIPE CONNECTION FOR OUTLET BOXES.
APPLICATION FILED NOV. 4, 1909.
1,000,043.
Patented Aug. 8, 1911.
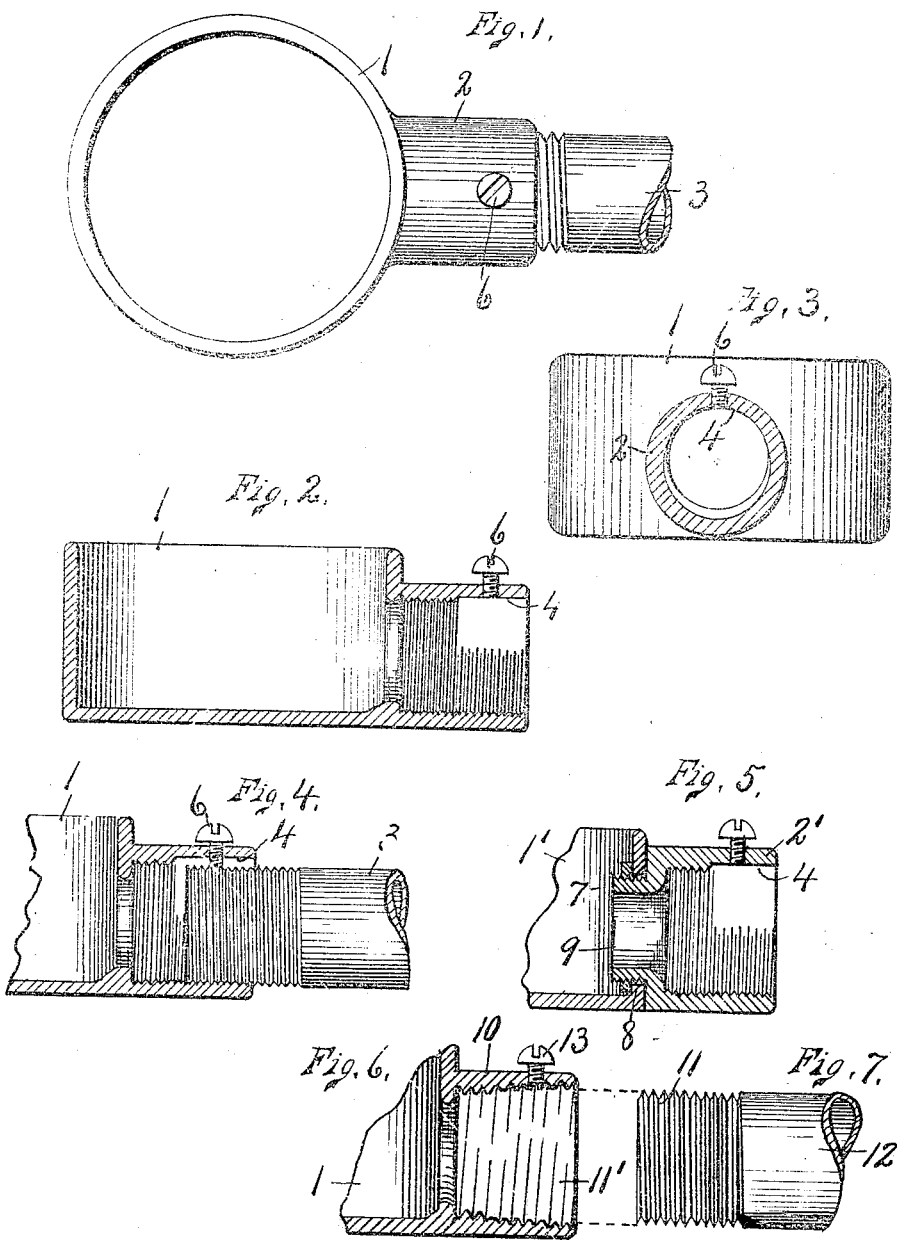

UNITED STATES PATENT OFFICE.

JOHN N. SCISM, OF SYRACUSE, NEW YORK.

PIPE CONNECTION FOR OUTLET-BOXES.

1,000,043.   Specification of Letters Patent.   Patented Aug. 8, 1911.

Application filed November 4, 1909. Serial No. 526,221.

*To all whom it may concern:*

Be it known that I, JOHN N. SCISM, of Syracuse, in the county of Onondaga, in the State of New York, have invented new and useful Improvements in Pipe Connections for Outlet-Boxes, of which the following, taken in connection with the accompanying drawings, is a full, clear, and exact description.

This invention relates to certain improvements in outlet boxes adapted to be used in connection with suitable pipes or conduits for receiving and concealing electric conductors and refers more particularly to means for connecting the pipe to the box. This connection is usually made by screwing the threaded end of the pipe into or upon a threaded neck or other threaded portion of the box but in many places in which these parts are installed it is practically impossible to turn one part upon the other to make a secure connection.

The object therefore is to enable such parts to be secured together against relative movement or disconnected without rotation one upon the other. In other words I have sought to securely lock the box and pipe together by means of a slip joint or telescoping connection having threads or shoulders adapted to interlock by relative radial movement of one or both parts and to be held in this position by separate locking means.

Other objects and uses will be brought out in the following description.

In the drawings: Figure 1 is a top plan of an outlet box and adjacent end of a pipe secured thereto by my improved fastening means. Fig. 2 is a lengthwise central sectional view of the detached box. Figs. 3 and 4 are sectional views taken on lines 3—3 and 4—4, Fig. 1, omitting the pipe in Fig. 3. Fig. 5 is a sectional view similar to Fig. 4 of a modified connection in which the neck of the box is detachable. Figs. 6 and 7 are respectively a sectional view similar to Fig. 4 of a further modification and an elevation of the end of a pipe adapted to interlock therewith.

These outlet boxes, as —1—, which may be made of any desired size or form are usually provided with a neck or hollow radial boss —2— threaded interiorly for receiving the threaded end of a pipe or conduit —3— one part being usually screwed upon the other by turning. In my present invention as shown in Figs. 1 to 4 inclusive substantially one-half of the threads in one side of the outer end of the socket are cut away circumferentially equal to or slightly in excess of twice the depth of the threads, thus forming a smooth semi-cylindrical bore portion —4— having a radius substantially equal to or greater than that of the threaded portion of the pipe —3— to the points of its threads, so as to allow this threaded end of the pipe to readily telescope with or move endwise into and out of the socket without engaging the threads of the parts one with the other. In other words by cutting away a circumferential portion of the threads at one end of one of the parts, in the manner described, a slip joint is established between such parts with the additional ability to bring the threaded portions into intermeshing engagement by radial adjustment of said parts where they are securely held against relative endwise movement by the intermeshing threads and by an additional retaining means as a set screw —6—. This set screw is preferably located in the side of the socket in which the threads are partially cut away and is adapted to engage the periphery of the adjacent threaded portion of the pipe —3—, so as to force said pipe radially in the opposite direction and cause its threads to intermesh with those of the corresponding side of the socket, said screw also serving to prevent relative rotation of the connected parts.

In Fig. 5 I have shown an outlet box —1'— as provided with a detachable neck or boss —2'— having a reduced threaded end —7— passed through an opening —8— in the adjacent side of the box —1'— where it is held in position by a lock nut —9— engaging the reduced threaded end and also the inner face of the adjacent side of the box, otherwise this neck or boss is substantially the same as that shown in Figs. 1 to 4 inclusive. In each of these modifications, however, the threads at the inner end of the socket are continuous circumferentially which allows the inner end of the pipe to be screwed thereinto where it is possible to turn one of the parts upon the other.

In Fig. 6 I have shown a further modified form of neck or boss —10— having a tapering threaded socket —11— in which the threads are continuous circumferentially, from end to end of the socket, although the diameter of the outer end of the threaded portion is equal to or slightly greater than the extreme diameter of the threaded portion as —11— of a pipe —12— which is adapted to be inserted therein. In this particular socket —10— after the tapering thread is cut, the points of the threads are cut away on a radius equal to or slightly greater than that of the threaded portion of the pipe, so as to allow such threaded portion to telescope or form a slip joint with said neck. This latter modification also shows the threads at the inner end of the sockets some distance from a set screw —13— as continuous and full circumferentially, that is their points are not cut away like those of the outer end of the socket which enables the pipe to be screwed thereinto if desired, when possible to turn one part upon the other. When the threaded end of the pipe —12— is inserted endwise in the socket without turning its threads are caused to intermesh by radial movement of one of the parts relatively to the other part and such threads are held in intermeshing engagement by the set screw —13—.

It will be seen from the foregoing description that in each of these modifications the parts are coupled together by a slip joint having threads or shoulders adapted to mesh or interlock with each other by radial adjustment of one of such parts in which position they are held by the set screws. In each of these modifications when the pipe is being inserted in the socket it is coaxial therewith but when secured in place by a set screw the pipe assumes an eccentric position in the socket.

What I claim is:

1. A pipe connection for outlet boxes comprising an internally threaded one-piece socket having portions of the threads at the outer end thereof cut away to form an opening of greater diameter than the threads at the inner end, whereby a pipe having threads of substantially the same diameter as the thread at the inner end may slide freely through the outer end and screw into the threads at the inner end of the socket.

2. A pipe connection for outlet boxes comprising a one-piece socket having internal threads portions of which are full and other portions near one end partially cut away said socket having a radial threaded aperture in the portion of one side having the cut away threads, and a screw in the threaded aperture.

In witness whereof I have hereunto set my hand on this 29th day of October, 1909.

JOHN N. SCISM.

Witnesses:
H. E. CHASE,
A. L. HUMPHREY.